(12) United States Patent
Magnusson

(10) Patent No.: US 7,554,653 B2
(45) Date of Patent: Jun. 30, 2009

(54) MULTITARGET

(75) Inventor: Björn Magnusson, Danderyd (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 11/607,096

(22) Filed: Dec. 1, 2006

(65) Prior Publication Data

US 2008/0129979 A1    Jun. 5, 2008

(51) Int. Cl.
*G01C 3/08* (2006.01)
(52) U.S. Cl. .................................... 356/5.04
(58) Field of Classification Search ............. 356/5.04, 356/3.01–3.15, 4.01–4.1, 5.01–5.15, 6–22
See application file for complete search history.

(56) References Cited

U.S. PATENT DOCUMENTS

| | | | |
|---|---|---|---|
| 4,731,762 A | 3/1988 | Hanks | |
| 5,699,149 A * | 12/1997 | Kuroda et al. | 356/4.01 |
| 6,115,112 A | 9/2000 | Hertzman et al. | |
| 6,414,746 B1 | 7/2002 | Stettner et al. | |
| 2005/0057741 A1* | 3/2005 | Anderson et al. | 356/5.01 |

* cited by examiner

*Primary Examiner*—Thomas H Tarcza
*Assistant Examiner*—Luke D Ratcliffe
(74) *Attorney, Agent, or Firm*—Harness, Dickey & Pierce, P.L.C.

(57) ABSTRACT

An electro optic distance measurement apparatus using time of flight measurements and a method therefore are provided for determining a distance to a target of two or more targets located along a common line of sight from the distance measurement apparatus. Approximate distances to the two or more targets are determined by means of the distance measurement apparatus, one of the two or more targets is selected, and an accurate distance to the selected target is determined by means of the distance measurement apparatus.

3 Claims, 1 Drawing Sheet

MULTITARGET

FIELD OF THE INVENTION

The invention relates to determining a distance to a target of two or more targets by means of an electro optic distance measurement apparatus using time of flight measurements, wherein the two or more targets are located along a common line of sight from the distance measurement apparatus.

BACKGROUND OF THE INVENTION

The development of so called direct reflex measurements (electro optic distance measurement without cooperative targets or prisms) has enabled accurate measuring of remote point without locating a physical target, such as a prism, and hence enabled possibilities for one person distance measuring.

There are two main electro optic distance measurement technologies, namely time of flight and phase shift.

The time of flight method is based on the use of short pulses sent from a measurement apparatus, reflected off a target, and detected back at the measurement apparatus. The distance to the target is calculated by means of round trip measurements for the pulses.

The phase shift method uses phase shift measurement of reflexes off a target of a beam sent from the measurement apparatus instead of roundtrip measurements.

In prior art time of flight methods, a limited measuring time interval is normally chosen in order to limit the processing time for identification of desired reflex pulses and in order to avoid identification of reflex pulses from objects in the same line of sight as the desired target. This is normally done by setting a measuring time interval corresponding to a range of distances within which the target is estimated to be, i.e. if the target is estimated to be within a distance range, the measuring apparatus is set to look for reflex pulses within a time interval corresponding to the roundtrip time for light for that distance range.

SUMMARY OF THE INVENTION

According to one aspect of the invention, a method is provided for determining a distance to a target of two or more targets by means of an electro optic distance measurement apparatus using time of flight measurements with or without the use of cooperative targets or prisms, wherein the two or more targets are located along a common line of sight from the distance measurement apparatus. Approximate distances are determined to the two or more targets by means of the distance measurement apparatus, one of the two or more targets is selected, and an accurate distance to the selected target is determined by means of the distance measurement apparatus.

Decision data for the selection of a target are produced in the form of the approximate distances determined by means of the distance measurement apparatus. These decision data are more reliable than a limitation of the measuring time interval selected by means of an estimated distance range using for example ocular inspection. Furthermore, the determining of approximate distances can be done without much delay.

Selecting one of the two or more targets and determining an accurate distance to the selected target by means of the distance measurement apparatus will then produce the accurate distance to the selected target without further delay.

The selection of one of the two or more targets can be based on the approximate distances, or if reflection ratios for the two or more targets are determined, on the reflection ratios for the two or more targets. Of course selection may also be based on the reflection ratios for the two or more targets and the approximate distances in combination.

Basing the selection of one of the two or more targets on the approximate distance and/or the reflection rations increases the probability of a selection of the desired target. The risk is reduced of identification of an erroneous target or no target within an estimated distance range and the delay which would then be caused.

Preferably, the approximate distances to the two or more targets are displayed on a display of the distance measurement apparatus. An input is received, via an input means of the distance measurement apparatus, which input indicates a selected target of the two or more targets.

Determining and displaying the approximate distances will provide decision data guiding a user of the distance measurement apparatus to identify the desired target of the two or more targets located on the same line of sight from the distance measurement apparatus. The risk is reduced of identification of an erroneous target or no target within an estimated distance range and the delay which would then be caused.

In addition to the determining of the approximated distances, reflection ratios may also be determined for the two or more targets. Such reflection ratios are then preferably also displayed on the display of the distance measurement apparatus.

The reflection ratio determined by and displayed on a display of the distance measurement apparatus will provide decision data guiding a user of the distance measurement apparatus to identify the desired target of the two or more targets located on the same line of sight from the distance measurement apparatus. The risk is reduced of identification of an erroneous target or no target within an estimated distance range and the delay which would then be caused.

According to another aspect of the invention, an electro optic distance measurement apparatus using time of flight measurements is provided. The apparatus is arranged to determine a distance to a target of two or more targets located along a common line of sight from the apparatus. The apparatus comprises a means for determining approximate distances to the two or more targets, a means for selecting one of the two or more targets, and a means for determining an accurate distance to the selected target.

The apparatus preferably comprises a display means arranged to display the approximate distances to the two or more targets, and an input means arranged to receive an input indicating a selected target of the two or more targets.

If the apparatus further comprises a means for determining reflection ratios for the two or more targets, the display means is preferably further arranged to display the reflection ratios for the two or more targets. In such a case the apparatus is preferably arranged to present both the reflection ratios and the approximate distances.

According to yet another aspect of the invention a computer program product is provided comprising instructions which, when processed by a processing means of an electro optic distance measurement apparatus using time of flight measurements, will cause the distance measurement apparatus to perform the steps of a method according to the invention.

BRIEF DESCRIPTION OF THE DRAWING

In the following a detailed description of embodiments is given with reference to the enclosed drawings on which.

DETAILED DESCRIPTION OF EMBODIMENTS

Electro optic distance measurement apparatuses using coarse measuring and fine measuring are known within the art. Examples of such distance measurement apparatuses are disclosed in U.S. Pat. No. 6,115,112.

In prior art, a coarse measuring procedure is first performed, wherein a measuring time interval can be formed, which preferably is selected to be longer than an anticipated propagation time for a measuring light pulse emitted from a distance measuring apparatus to propagate towards a target, be reflected by it and be received by the distance measuring apparatus.

Preferably, a light pulse produced by an distance measurement apparatus is divided into an measuring light pulse part and an internal light pulse part. The same measuring channel should then be used for "external measuring", that is to say transmitting measuring light pulses to and receiving them from a distant target, and for "calibration measuring" in a internal measuring loop in the instrument. The same light pulse is used for these measurements and received by the same receiver in order to get true measurements of the time difference in real time.

In prior art the coarse measuring procedure is not in the first instant intended to give a coarse measurement of the distance itself but a coarse estimation of where the internal and the external measuring pulses end up within the measuring time region. The distance between the indicated measuring pulses gives, with correction for possible introduced delays, a coarse estimation of the expected round trip time.

A measuring time region is set up around a time in the measuring time interval where the reflected measuring pulse can be expected to arrive, or at least a starting point for this is set up for the time region where the reflected measuring pulse is estimated to arrive. Thereafter a number of fine measurements are performed.

Different methods of coarse measuring are conceivable. In a first method for coarse measuring a single light pulse transmitted towards the target. A clock which has an extremely high clock frequency is then used together with a calculator. The calculator is started at the transmission of the single pulse stops at the reception of a reflex pulse.

In a second method for coarse measuring, the coarse measuring is performed during a coarse measuring procedure with a number of transmitted coarse measuring pulses. For this second method for coarse measuring, the special clock generator of the first method for coarse measuring is not required, as the coarse measuring procedure is performed with the use of the same circuits used for the fine measurements.

A combination of the two above-mentioned coarse measuring cases is also conceivable. The first method can for example be performed with a number of smaller pulses.

Figure 1:
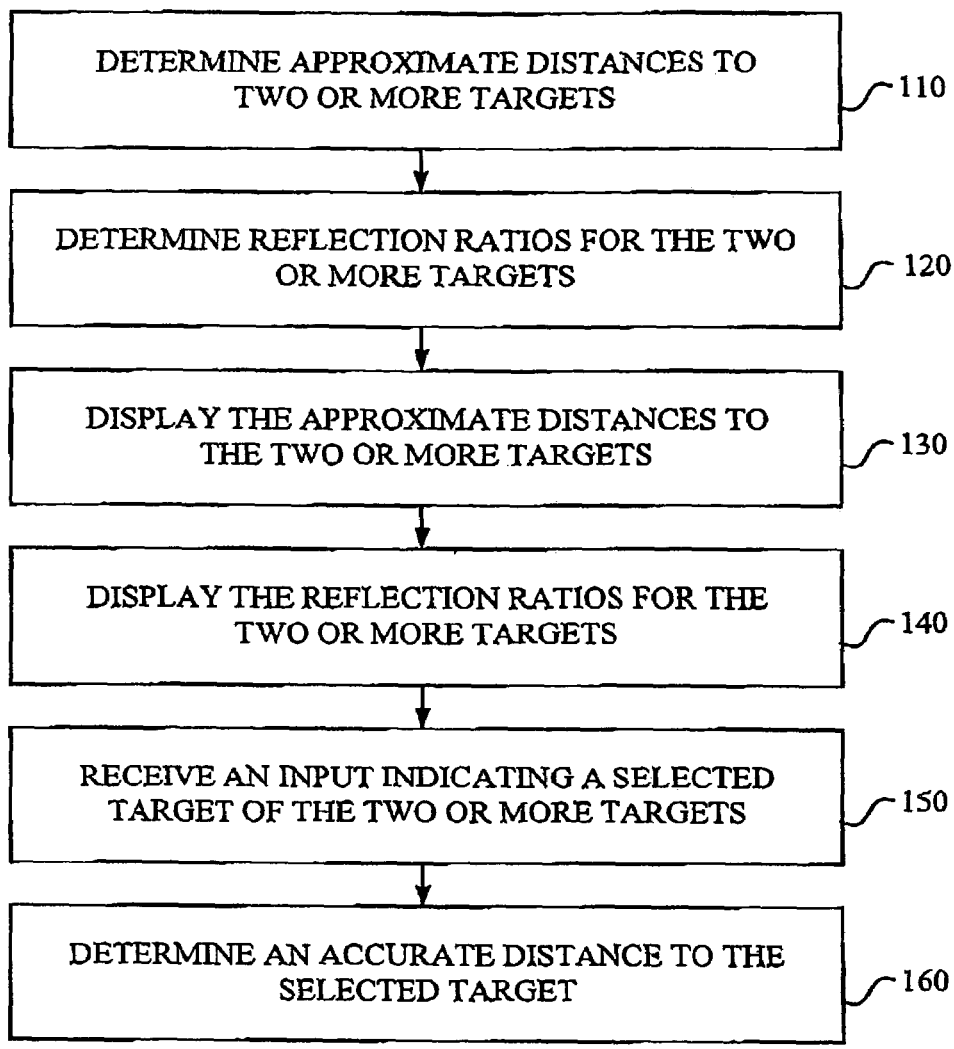
FIG. 1 shows a flow chart of a method according to an embodiment of the invention.

In FIG. 1 a flow chart of an embodiment of the method according to the invention is shown. According to the embodiment a distance to a target of two or more targets is determined by means of an electro optic distance measurement apparatus using time of flight measurements for a case where the two or more targets are located along a common line of sight from the distance measurement apparatus. The distance measurement apparatus makes use of short measurement light pulses, typically laser light pulses, which are reflected off targets, and detected as reflected light pulses back at the distance measurement apparatus.

The embodiment makes use of the coarse measurement according the prior art not only to determine the a coarse estimation of where reflected light pulses end up within a measuring time region but also for measurements of approximate distances. In particular, in the embodiment the coarse measurement is used in step 110 to determine approximate distances to two or more, preferably all, targets corresponding to the measuring time region. The measuring time region is selected broadly in order to ensure that reflexes for the desired target falls within that time region.

In addition to determining approximate distances to the two or more targets, reflection ratios are determined for the two or more targets in step 120, i.e. a measure of the portions of emitted measurement light pulses that are reflected off the two or more targets as reflected light pulses back to the distance measurement apparatus.

The approximate distances and reflex ratios for the two or more targets are then displayed at the distance measurement apparatus on a display in steps 130 and 140, e.g. as "One target at approximately 20 meters with a reflection of 30% and one target at approximately 35 meters with a reflection of 70%."

In addition to the approximate distances and reflection ratios for the two or more targets, the display may also include an indication that a selection is to be made, e.g. by displaying the question "Which target to you want to measure at?" or similar.

A user of the distance measurement apparatus then selects one of the two or more targets by means of input via an input means of the distance measurement apparatus, for example via a key pad, a touch screen or other suitable input means for selection of one of a set of given options.

After receipt in step 150 of an indication of a selected target of the two or more targets, fine measurements are performed for the selected target to determine an accurate distance to the selected target in step 160.

By means of an embodiment of the invention a user of a distance measurement apparatus is guided through a distance measurement to a desired target for a case where there are two or more targets along the line of sight from the distance measurement apparatus towards the desired target. Also the user of the distance measurement apparatus is given decision data in the form of approximate distances and/or reflection ratios for the two or more targets which reduces the risk of erroneously performing fine measurement for a target other than the desired target.

Figure 2:
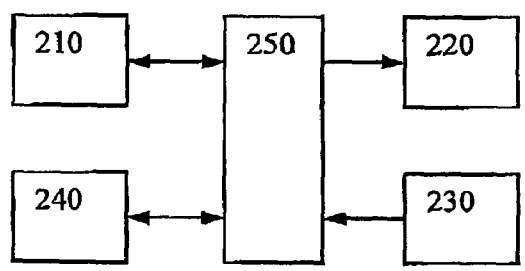
FIG. 2 shows a schematic block diagram of an apparatus according to an embodiment of the invention.

In an embodiment of an apparatus of the invention shown in FIG. 2, a prior art distance measurement apparatus disclosed above is adapted so that a means 210 for coarse measurement is adapted to determine approximated distances to two or more targets along the line of sight from the distance measurement apparatus towards the desired target. The approximate distances to the two or more targets are displayed on a display 220 of the distance measurement apparatus and input means 230 are provided, e.g. a key pad, a touch screen or other suitable input means for selection of one of a set of given options, for an input indicating the selection of one of the two or more targets.

After receipt of an indication of a selected target of the two or more targets, the embodiment of the apparatus is then adapted to perform fine measurements according to prior art principles in a means 240 for fine measurement. The fine measurements are performed only for the selected target to determine an accurate distance to the selected target. The means 210 for coarse measurements may use the same circuits as the means 240 for fine measurements.

The adaptation of the prior art distance measurement means is preferably made by having control means 250 of the distance measurement apparatus control the means 210 for course measuring to determining approximate distances to the two or more targets. The control means are also arranged to control the means 240 for fine measurements to determine the distance to a target in accordance with a selection indicated via the input means 230.

The invention claimed is:

1. A method for determining a distance to a target of two or more targets by means of an electro optic distance measurement apparatus using time of flight measurements, the two or more targets being located along a common line of sight from the distance measurement apparatus, the method comprising:
    determining, by means of the distance measurement apparatus, approximate distances to the two or more targets, the approximate distances being determinable when the distance measurement apparatus is in a common line of sight with the two or more targets;
    determining reflection ratios for the two or more targets,
    displaying, on a display of the distance measurement apparatus, the approximate distances to the two or more targets and the reflection ratios for the two or more targets;
    selecting one of the two or more targets, wherein the selection is based on the reflection ratios for the two or more targets and the approximate distances in combination;
    receiving, via an input means of the distance measurement apparatus, an input indicating a selected target of the two or more targets; and
    determining, by means of the distance measurement apparatus, an accurate distance to the selected target.

2. An electro optic distance measurement apparatus using time of flight measurements, for determining a distance to a target of two or more targets located along a common line of sight from the distance measurement apparatus, comprising:
    a means for determining approximate distances to the two or more targets, the approximate distances being determinable when the distance measurement apparatus is in a common line of sight with the two or more targets;
    a means for determining reflection ratios for the two or more targets;
    a display means arranged to display the approximate distances to the two or more targets, wherein the display means is further arranged to display the reflection ratios for the two or more targets;
    a means for selecting one of the two or more targets;
    an input means arranged to receive an input indicating a selected target of the two or more targets; and
    a means for determining an accurate distance to the selected target.

3. Computer program product comprising instructions which, when processed by a processing means of an electro optic distance measurement apparatus using time of flight measurements, will cause the distance measurement apparatus to perform the steps of claim 1.

* * * * *